United States Patent [19]
Kumada et al.

[11] 3,936,146
[45] Feb. 3, 1976

[54] IRREGULAR FERROELECTRIC ELEMENT FOR CONTROLLABLE SINGLE DOMAIN

[75] Inventors: Akio Kumada, Kodaira; Hiroshi Takano; Yoshizumi Eto, both of Hachioji; Masao Hibi, Kodaira, all of Japan

[73] Assignee: Hitachi, Ltd., Japan

[22] Filed: Mar. 3, 1970

[21] Appl. No.: 16,199

[30] Foreign Application Priority Data
Mar. 15, 1969 Japan.............................. 44-19912

[52] U.S. Cl. ............. 350/149; 340/173.2; 350/150; 350/157
[51] Int. Cl.² ......................................... G02F 1/05
[58] Field of Search.................... 350/150, 157, 160; 340/173 LT, 173 SS, 133 SS

[56] References Cited
UNITED STATES PATENTS

| | | | |
|---|---|---|---|
| 2,936,380 | 5/1960 | Anderson............................ | 350/150 |
| 3,521,262 | 7/1970 | Paul..................................... | 350/150 UX |
| 3,559,185 | 1/1971 | Burns et al.......................... | 350/150 UX |
| 3,586,415 | 6/1971 | Kumada et al...................... | 350/150 |

OTHER PUBLICATIONS

Miller et al., "Velocity of Sidewise 180° Domain—Wall Motion . . ." Phys. Rev. Vol. 112, No. 3, (Nov. 1, 1958), pp. 755–762.
Hill et al., "Optical Behavior of Domains in $KH_2PO_4$," Phys. Rev. Vol. 135, No. 6A, (Sept. 14, 1964), pp. A1640–A1642.
Shabana et al., "Electrooptical Activity of . . . Switched Domains . . ." Proc. IEEE Vol. 54, (Jan., 1966), pp. 85–86.
Land, "Ferroelectric Ceramic Electrooptic Storage and Display Devices" Sandia Corp., Reprint SC-R-67-1219 (Oct., 1967), pp. 17–20 & 42–44.
Bornarel et al., ". . . Evidence for . . . Interaction of Domains in Ferroelectric $KH_2PO_4$," J. App. Phys. Vol. 39, No. 9, (Aug. 1968), pp. 4339–4341.
Kumada, "Domain Switching in $Gd_2(MoO_4)_3$" Phys. Lett. Vol. 30A, No. 3, (Oct. 6, 1969), pp. 186–187.
Cummins, "Electrical, Optical, and Mechanical Behavior of Ferroelectric $Gd_2(MoO_4)_3$" Ferroelectrics Vol. 1, No. 1, (Mar., 1970), pp. 11–17.

Primary Examiner—John K. Corbin
Attorney, Agent, or Firm—Craig & Antonelli

[57] ABSTRACT

An element in which only a single domain-wall can move sidewise, having a crystal plate of an irregular ferroelectric which is cut in the Z-plane at opposite surfaces and is then cut or cleaved in the <110> direction at its periphery and transparent electrodes for the polarization reversal provided at the central portions of the opposite Z-planes. The element includes at least a domain configuration such that two nucleus regions of opposite polarities are disposed on opposite sides of the region, i.e., a domain having a stationary polarity, where the electrodes are provided.

19 Claims, 45 Drawing Figures

MECHANICAL FORCE APPLYING MEANS

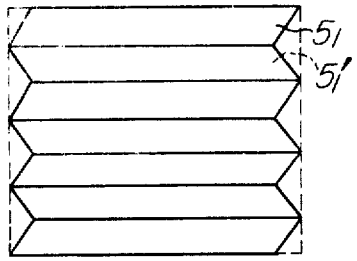
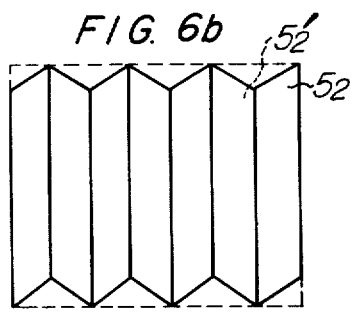
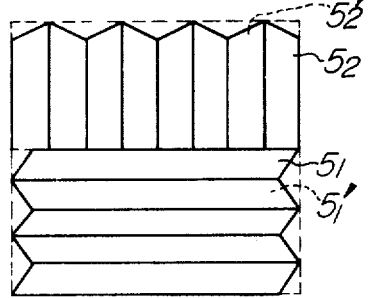
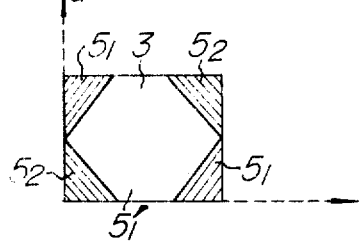
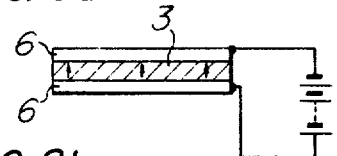
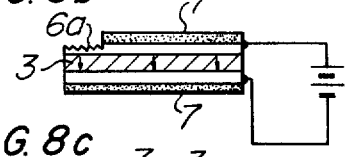
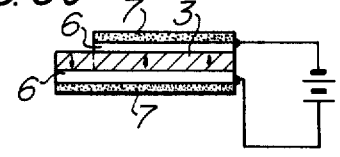
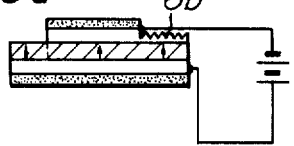
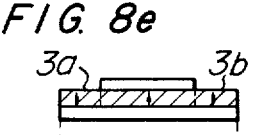
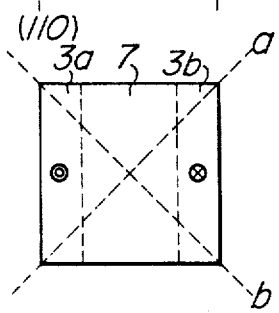

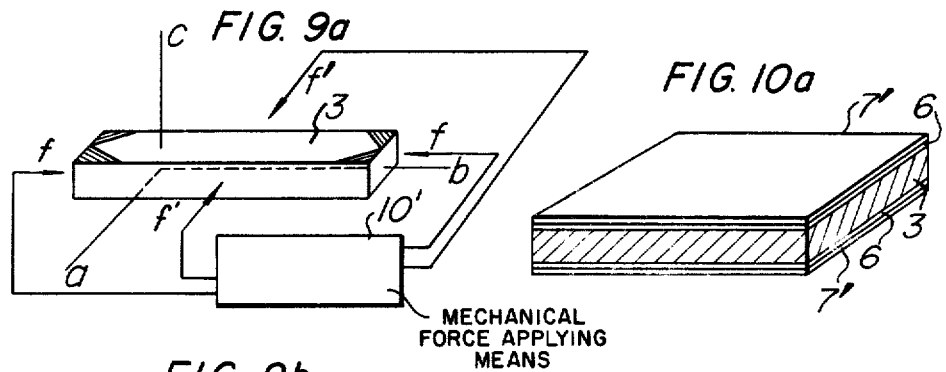
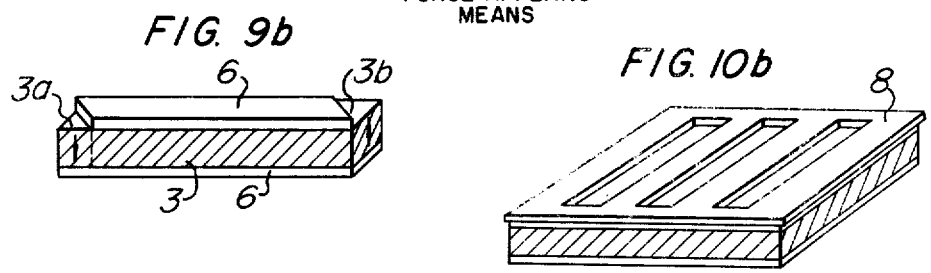
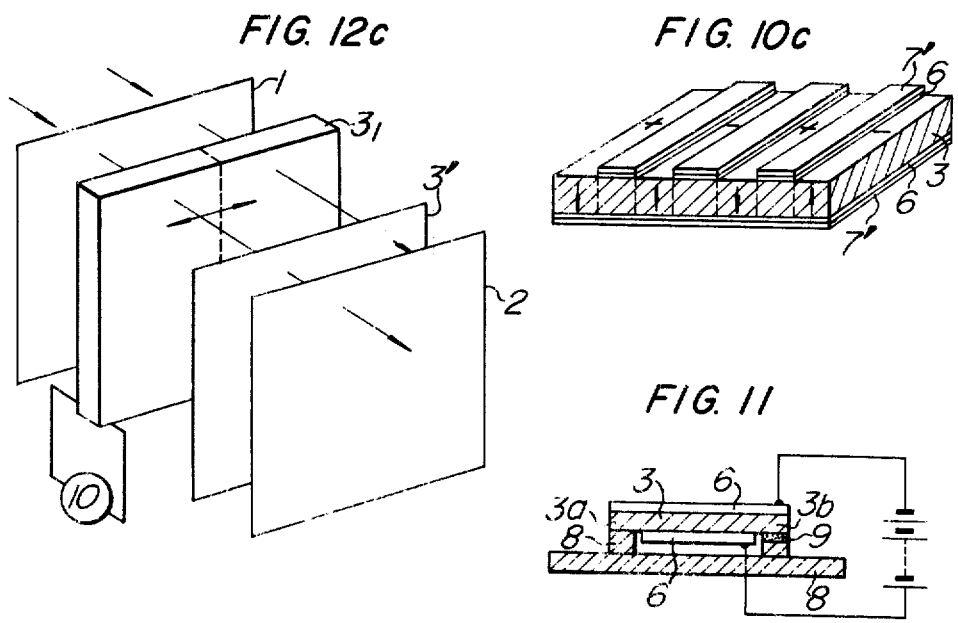
INVENTORS
AKIO KUMADA, HIROSHI TAKANO,
YOSHIZUMI ETO and MASAO HIBI
BY
Craig, Antonelli, Stewart & Hill
ATTORNEYS

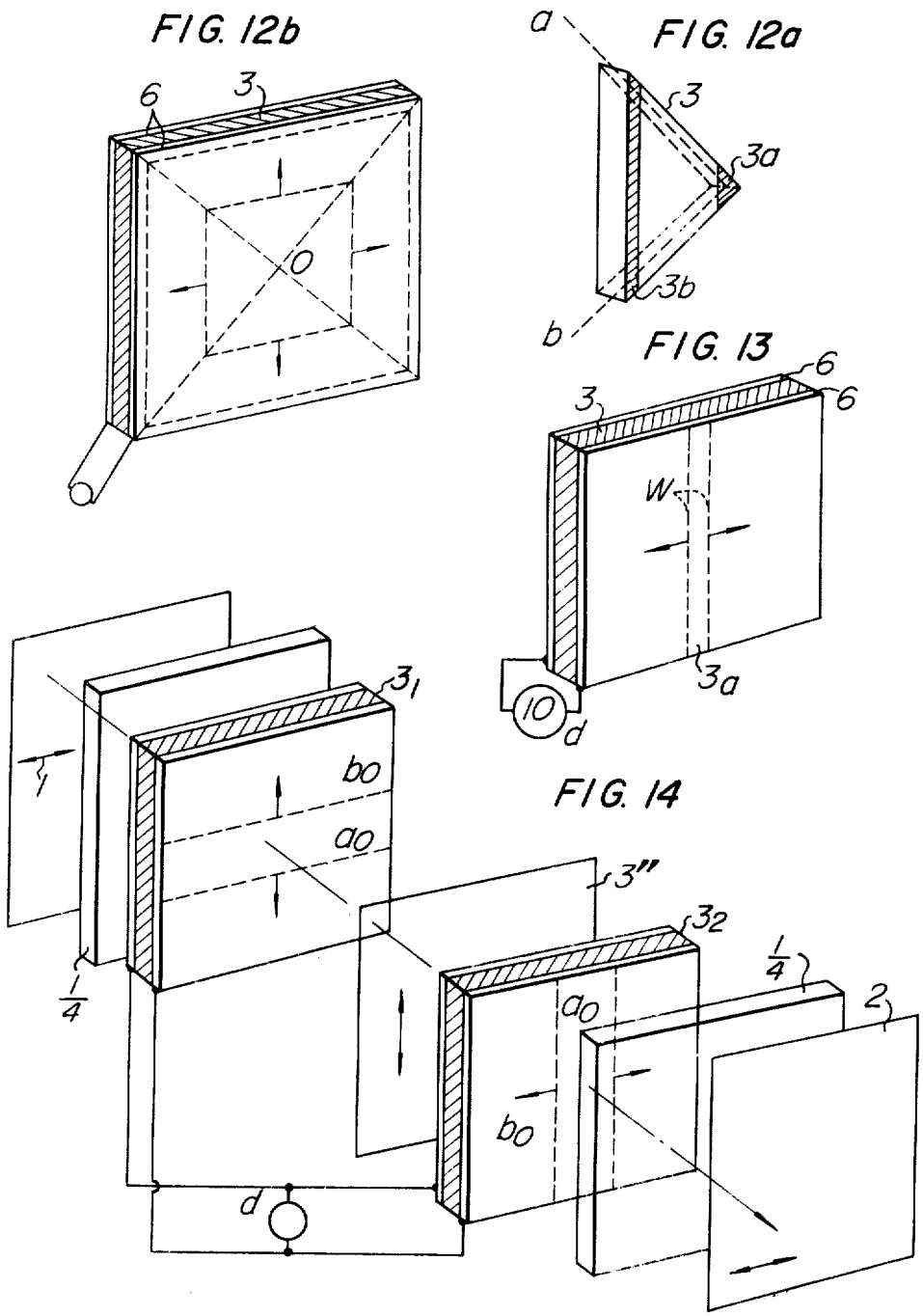

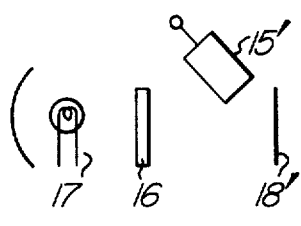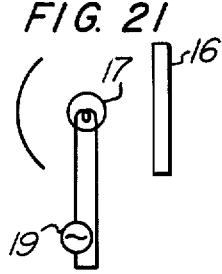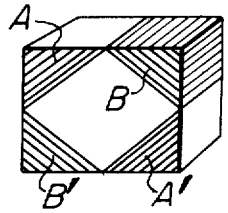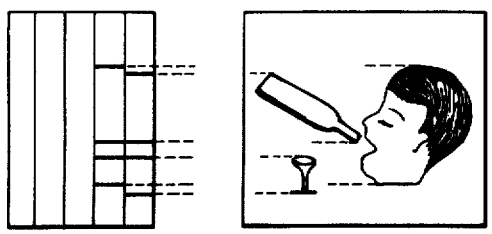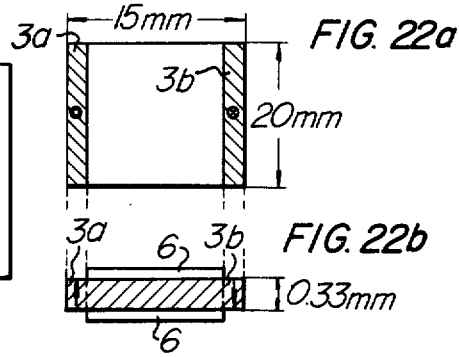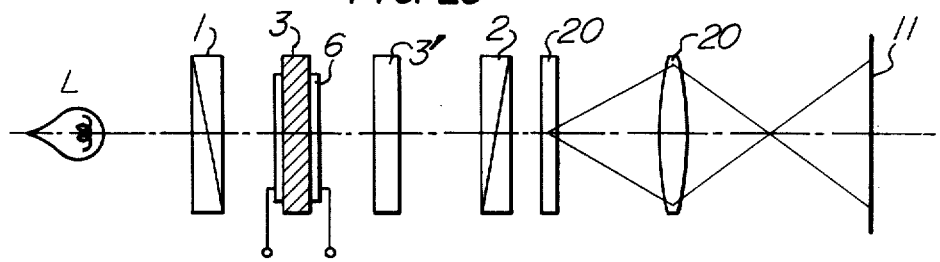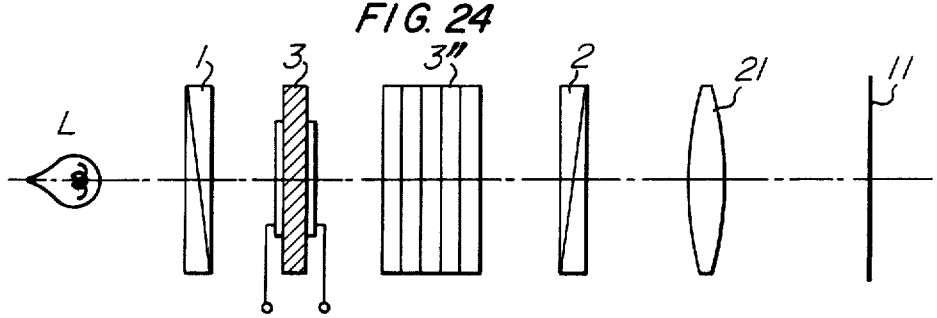

IRREGULAR FERROELECTRIC ELEMENT FOR CONTROLLABLE SINGLE DOMAIN

This invention relates to an irregular ferroelectric single-domain controllable element which is devised for single domain-wall motion and to a method of making such an element. This invention also relates to an apparatus which utilizes such an irregular ferroelectric element.

It is a primary object of the present invention to provide an irregular ferroelectric element for controllable single-domain in which only a single domain-wall can move sidewise and which is free from the growth of nucleus regions crossing at right angles with respect to each other and a method of making such an irregular ferroelectric element.

Another object of the present invention is to provide an irregular ferroelectric element for controllable single-domain of the kind described above in which the positive and negative domains can be freely grown and extinguished.

A further object of the present invention is to provide an electrically controlled shutter for transmitted light which utilizes an irregular ferroelectric element of the kind described above.

A still further object of the present invention is to provide an optical slit which utilizes an irregular ferroelectric element of the kind described above.

Another object of the present invention is to provide a two-dimensional flying spot scanner which utilizes an irregular ferroelectric element of the kind described above.

In accordance with the present invention which attains the above objects, there is provided a method of making an irregular ferroelectric element for controllable single-domain which is devised for single domain-wall motion comprising the steps of growing a single domain of positive or negative polarity throughout a Z-plate of irregular ferroelectric relative to the opposite Z-planes of said crystal plate provided with electrodes, leaving from the abovementioned nucleus region which has the same polarity as to the applied voltage and adjacent to one end of the domain of the inverse polarity against to the applied voltage grown in the first step in the same polarity as to the applied voltage and growing throughout a domain of the inverse polarity and arriving to the second nucleus region of the inverse polarity to the first nucleus region adjacent to the end opposite to the end having said first nucleus region referred to in the second step and providing means for the polarization reversal and single domain-wall motion towards the nucleus region of inverse polarity.

In accordance with the present invention, there is further provided an irregular ferroelectric element for controllable single-domain devised for single domain-wall motion comprising a crystal plate of irregular ferroelectrics which is provided with electrodes on Z-planes at a pair of surfaces opposite to each other and is then cut or cleaved in the <110> direction, and means for the polarization reversal provided at the central portions of the opposite Z-planes of said crystal plate, said irregular ferroelectric element including at least a domain configuration such that two nucleus regions of opposite polarities are disposed on opposite sides of the region where said means for the polarization reversal are provided.

The present invention further provides an optical apparatus which includes therein such an irregular ferroelectric element such that the amount of light transmitted through the apparatus can be freely controlled by allowing the growth or restricting the growth of one of the nucleus domains of the irregular ferroelectric element.

The irregular element for controllable single domain according to the present invention has the following advantages:

1. The element is advantageous over a prior art element of this kind which resorts to a method of merely growing a new single domain in ferroelectric crystal, because the element is free from any damage and the motion of the domain-wall takes place readily in response to the application of a small voltage.

2. Switch-over of the applied voltage causes immediately the growth of the domain of opposite polarity from a domain having a stationary polarity and the domain grown prior to the voltage switch-over can be reversed. Thus, the domain of positive or negative polarity can be freely grown as desired. In addition, the direction of the domain-wall motion can be freely controlled by selecting the polarity of the applied voltage.

3. The rate of growth of the domain can be freely controlled by regulating the magnitude of the applied voltage.

4. The element can be combined with other optical apparatus for application to various services.

Other objects, features and advantages of the present invention will be readily apparent from the following detailed description taken in conjunction with the accompanying drawings, in which:

FIGS. 6a, 6b and 6c are schematic views showing a plurality of kinds of domain patterns produced in an irregular ferroelectric crystal;

FIG. 7 is a schematic view showing how domains crossing at right angles with each other appear in a gadolinium molybdate (MOG) crystal;

FIGS. 8, 8a, 8b, 8c, 8d and 8e are schematic views showing the successive steps for the manufacture of an irregular ferroelectric element according to an embodiment of the method of the present invention utilizing the domain switching in an irregular ferroelectric crystal;

FIGS. 9a and 9b are schematic views showing the successive steps in another embodiment of the method of the present invention utilizing the domain switching in an irregular ferroelectric crystal;

FIGS. 10a, 10b and 10c are schematic views showing the successive steps in a further embodiment of the method of the present invention utilizing the domain switching in an irregular ferroelectric crystal;

FIG. 11 is a schematic view showing a yet further embodiment of the method of the present invention utilizing the domain switching in an irregular ferroelectric crystal;

FIGS. 12a, 12b and 12c show the structure of an electrically controlled shutter for transmitted light employing an irregular ferroelectric element according to the present invention;

FIG. 13 shows the structure of an optical slit unit employing an irregular ferroelectric element according to the present invention;

FIG. 14 shows the structure of an electrically controlled shutter for transmitted light employing two optical slit units of the kind shown in FIG. 13;

FIG. 20a shows the structure of still another image generator employing the two-dimensional flying spot scanner shown in FIG. 18;

FIG. 21 shows the structure of yet another image generator employing the two dimensional flying spot scanner shown in FIG. 18;

FIGS. 22a and 22b are a front elevational view and a sectional view, respectively, of one form of the irregular ferroelectric element according to the present invention;

FIG. 23 shows the structure of a slide projector employing the irregular ferroelectric element shown in FIGS. 22a and 22b;

FIG. 24 shows the structure of another slide projector employing the irregular ferroelectric element shown in FIGS. 22a and 22b;

FIG. 24a shows an exemplary picture depicted on a half-wave plate assembly shown in FIG. 24, and FIG. 25 shows orthogonal domains produced in the irregular ferroelectric element according to the present invention.

In U.S. Pat. No. 3,586,415 an optical modulator element comprising the combination of an irregular ferroelectric crystal, especially Z-plate of gadolinium molybdate single crystal provided with electrodes and a double refractive crystal plate is disclosed. According to the discovery of the inventors, application of an electric field which is at least equal to the coersive field of the said irregular ferroelectric single crystal across the Z-planes of the irregular ferroelectric single crystal can cause a change in the retardation of light transmitting through the element before and after the application of the electric field, and thus this element can constitute a sort of color-modulator for incident white light or a light intensity-modulator for incident monochromatic light.

Figure 1:
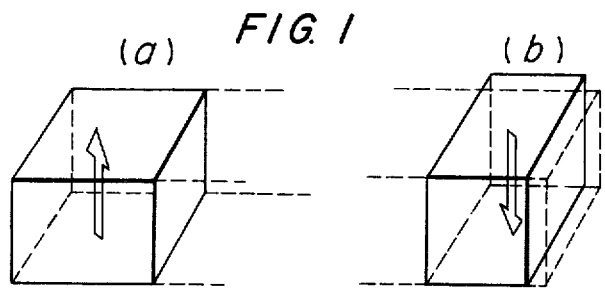
FIG. 1 is a schematic explanatory view showing the manner of crystal deformation occurring in a ferroelectric crystal due to the polarization reversal.
Figure 3:
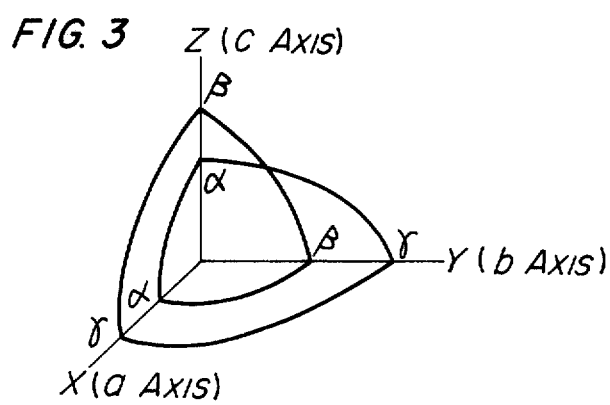
FIG. 3 is a diagrammatic view showing a portion of the refractive indicatrix of a bi-axial crystal.

As a result of profound investigation on the symmetry of ferroelectrics, the inventors have found that certain ferroelectric crystals such as a crystal of potassium dihydrogen phosphate (hereinafter to be referred to as KDP) and a crystal of gadolinium molybdate (hereinafter to be referred to as MOG) behave differently from known ferroelectric crystals such as a crystal of triglycine sulfate (hereinafter to be referred to as TGS), a crystal of lead zirconate-titanate (hereinafter to be referred to as LZT) and a crystal of barium titanate when an electric field or stress of more than a threshold value (hereinafter to be referred to as a coersive field or coersive stress) is applied thereto. More precisely, when a coersive field or coersive stress is applied to a crystal of KDP or MOG, the crystal lattice having bistable states as shown in FIG. 1a or 1b makes a shift from one spontaneously deformed state to another and, simultaneously, a 180° reversal of the direction of the spontaneous polarization takes place. Further, simultaneously with the reversal in the direction of the spontaneous polarization, the crystal lattice undergoes crystallographically a symmetry operation of inversion rotation so that it is deformed into a structure which is rotated through 90° about the c axis. Such a property is peculiar to certain ferroelectrics belonging to the point group mm2. Such ferroelectrics were called by the inventors by the name of irregular ferroelectrics and classified to belong to a point group imm2 including such species as $\overline{4}2$ mF mm2, $\overline{6}$ m2F mm2 and $\overline{4}3$ mF mm2. A crystal of such an irregular ferroelectric is optically bi-axial in the ferroelectric phase and the refractive indices $\alpha$, $\beta$ and $\gamma$ for light vibrating parallelly with the directions of the $a$, $b$ and $c$ axis of the crystal differ from each other as seen in FIG. 3. For example, the values of Na, Nb and Nc of a single crystal of MOG belonging to the point group imm2 are Na = 1.8428, Nb = 1.8432 and Nc = 1,897 when $\lambda$= 589.3.

As will be apparent from these values, a crystal belonging to the point group imm2 shows birefringence which is the feature of an optically bi-axial crystal.

Figure 2:
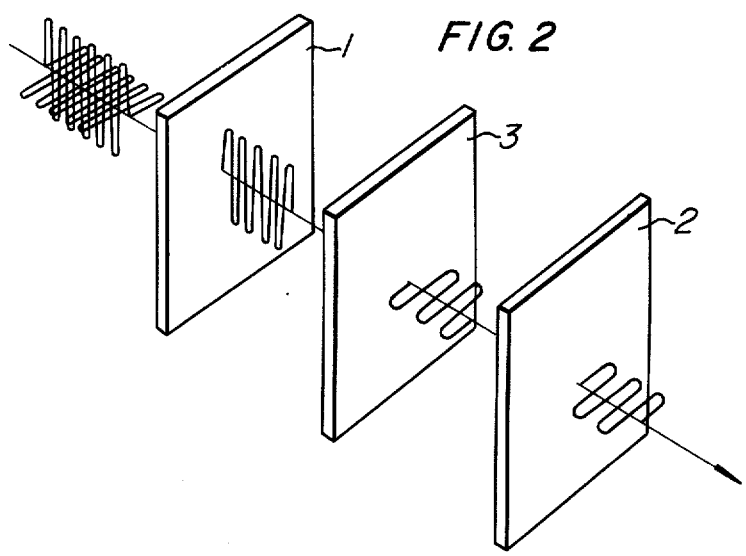
FIG. 2 is a schematic explanatory view showing the mechanism of rotation of linearly polarized light by a ferroelectric crystal.

A crystal plate of MOG having such a property is of a Z-plate, that is, cut at opposite surfaces perpendicularly with respect to the c axis. The Z-plate of MOG designated by the reference numeral 3 is interposed between a polarized 1 and an analyzer 2 whose planes of polarization cross at right angles with each other and whose plate surfaces are parallel to each other in such a manner that the direction of the C axis of the crystal plate 3 is perpendicular with respect to the planes of polarization as shown in FIG. 2. When a beam of white light enters the polarizer 1 at right angles with respect to the latter, the white light linearly polarized by the polarizer 1 is turned into ellipsoidally polarized light by the effect of double refraction of the crystal plate 3, and the component of the ellipsoidally polarized light which is parallel to the polarizing direction of the analyzer 2 passes solely through the analyzer 2 so that interference colors can be observed due to the phase difference between the various wavelengths which constitute the white light. A crystal of such an irregular ferroelectric having the symmetry of imm2 is cut into a plate whose sides are parallel to the crystal axis, the faces of the plate are polished to be optically flat surfaces, and electrodes are provided on the Z-planes thereof. When the crystal is interposed in a diagonal position between crossed polarizers and a beam of white light is projected on the optical system, interference colors due to the birefringence appear depending on the thickness of the crystal. This is attributable to the phase difference between the beams of double refracted light passing through the crystal and having the planes of polarization perpendicular with respect to each other, that is, this phenomenon is caused by the retardation R. As is commonly known, the retardation R is related to the thickness d of the crystal through which the light beam is transmitted and the birefringence, i.e., the difference $\Delta n$ between the refractive indices concerning to the transmitting light beam as follows:

$$R = \frac{2\pi}{\lambda}(d \cdot \Delta n)$$

The refractive indicatrix of an irregular ferroelectric crystal relative to the principal elastic axis X, Y and Z is as shown in FIG. 3. Thus, a beam of light advancing in the direction of the Z axis in FIG. 3 is refracted with two different refractive indices $\alpha$ and $\beta$, and the birefringence $\Delta n$ is given by the difference $\beta - \alpha$. Similarly, a beam of light advancing in the direction of the X axis is refracted with two different refractive indices $\gamma$ and $\alpha$, while a beam of light advancing in the direction of the Y axis is refracted with two different refractive indices $\gamma$ and $\beta$. In this respect, it is to be noted that the beam of light advancing in the direction of the Z axis, that is, perpendicularly with respect to the Z-planes of a Z-plate of MOG is most advantageously utilized so that the crystal plate of MOG can constitute a color modulator because the length d of the path of light as well as the difference $\beta - \alpha$ between the refractive indices $\alpha$ and $\beta$ remains invariable even when the crystal plate of MOG is subject to the polarization reversal. U.S. Pat. No. 3,586,415 referred to above utilizes this principle. The principle and structure of the apparatus disclosed in said patent application will be described in detail hereunder.

When an electric field greater than the coersive field is applied to the Z-plate 3 of MOG shown in FIG. 2, the reversal of the spontaneous polarization takes place and the plane of optic axis of the crystal is rotated by 90° with the result that the direction of rotation of the ellipsoidally polarized light emerging from the crystal is reversed. Therefore, the retardation R in such a case has a sign opposite to the sign of the previous retardation R.

Figure 4:
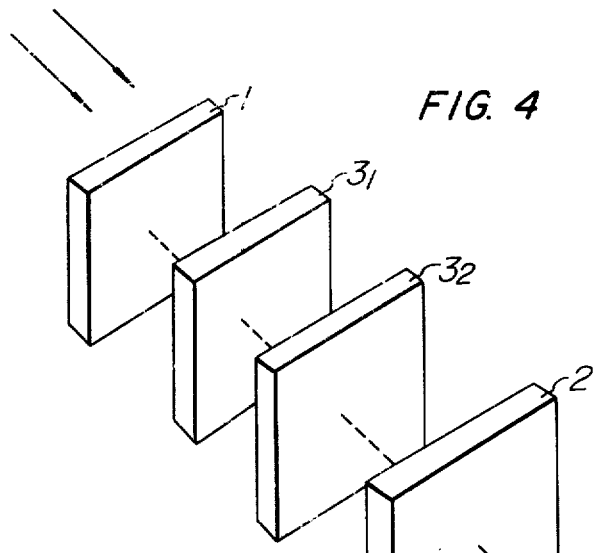
FIG. 4 is a schematic explanatory view showing how a change in the retardation of transmitted light occurs when linearly polarized light is projected to an apparatus including the combination of an irregular ferroelectric crystal and a common double refractive material.

Referring to FIG. 4, a transparent and birefringent crystal $3_1$ and a Z-plate of irregular ferroelectric crystal $3_2$ (such as a Z-plate of MOG) are disposed in a polarizing apparatus comprising a polarizer 1 and an analyzer 2 disposed in parallel with each other so that the Z-planes of the crystal $3_2$ are perpendicular with respect to the optical axis of the polarizing apparatus and the principal axis of these two crystals are oriented in the same direction. The retardations $R_1$ and $R_2$ by the respective crystals are added to each other when the crystal of MOG is not subject to reversal of the polarization, but one of the retardations is subtracted from the other when an electric field is applied to the crystal of MOG to cause the polarization reversal in the latter crystal so that, in this latter case, the composite retardation by these two crystals is represented by the difference between $R_1$ and $R_2$. Thus, the interference colors due to the birefringence against white light entering the polarizing apparatus in the case of the relation $R_1 + R_2$ differ from those in the case of the difference between $R_1$ and $R_2$. According to such method, an apparatus can be made in which an assembly comprising the combination of one or more birefringent crystal plates and at least one Z-plate of irregular ferroelectric belonging to the point group imm2 is interposed between a polarizer and an analyzer disposed in parallel with each other and an electric field or a stress greater than the coersive field or the coersive stress is applied to the irregular ferroelectric crystal to reverse the spontaneous polarization of the irregular ferroelectric crystal thereby to modulate the hue or amount of light transmitting through the above assembly before and after the reversal of the spontaneous polarization.

The inventors have discovered that certain substances belonging to the point groups i2-I and i2-II possess also the above property in addition to the crystals of irregular ferroelectrics belonging to the point group imm2. Known irregular ferroelectric substances belonging to these point groups are tabulated in Table 1 as follows:

Table 1

| Point group | Substance | Name |
|---|---|---|
| imm2 | | KDP, MOG, boracite |
| i2-I | | |
| i2-II | | Rochelle salt, ammonium cadmium sulfate, methyl ammonium aluminum sulfate 12-hydrate |

In Table 1, point group imm2 which includes such species $\overline{4}2$ mF mm2, $\overline{6}$ m2F mm2 and $\overline{4}3$ mF mm2 is more useful than other two groups.

According to the studies carried out by the inventors, those substances having a crystal structure isomorphous with MOG and represented by the formula $(R_xR'_{1-x})_2O_3 \cdot 3Mo_{1-e}$ We $O_3$ where R and R' represent at least one of rare earth elements, x lies in the range of 0 to 1.0, and e lies in the range of 0 to 0.2) have the property preferably usable in the present invention. The substances represented by the above formula belong crystallographically to the orthorhombic system Pba2 and belong to the point group mm2.

The substances represented by the formula $(R_xR'_{1-x})_2O_3 \cdot 3Mo_{1-e}$ We $O_3$ having a crystal structure isomorphous with MOG preferably employed in the present invention will now be described. A method of making a single crystal of $(R_xR'_{1-x})_2O_3 \cdot 3Mo_{1-e}$ We $O_3$ (where R and R' represent at least one of the rare earth elements, x lies in the range of 0 to 1.0, and e lies in the range of 0 to 0.2) is known from the disclosure of Japanese Pat. No. 3493/1968. However, the crystal structure isomorphous with MOG specified in this application is one in which the lattice parameters a and b are equal to each other.

The following is the result of measurement on MOG employed in the present invention by means of a 3-axis goniometer and X-ray diffractive method:
a = 10.388 ± 0.005 A
b = 10.426 ± 0.005 A
c = 10.709 ± 0.005 A
Thus, MOG is a crystal of the orthorhombic system and belongs to the point group mm2.

$Eu_2(MoO_4)_3$, $Tb_2(MoO_4)_3$, $Dy_2(MoO_4)_3$ and $Sm_2(MoO_4)_3$ are isomorphous with MOG crystallographically and their lattice parameters measured by the X-ray diffractive method are different from each other depending on the a and b axis as shown in Table 2. All these compounds have the same crystal structure as MOG.

Table 2

| Sample | a (A) | b (A) | c (A) |
|---|---|---|---|
| $Eu_2(MoO_4)_3$ | 10.377 ± 0.005 | 10.472 ± 0.005 | 10.655 ± 0.005 |
| $Gd_2(MoO_4)_3$ | 10.388 ± 0.005 | 10.426 ± 0.005 | 10.709 ± 0.005 |
| $Dy_2(MoO_4)_3$ | 10.331 ± 0.005 | 10.346 ± 0.005 | 10.603 ± 0.005 |
| $Sm_2(MoO_4)_3$ | 10.478 ± 0.005 | 10.511 ± 0.005 | 10.856 ± 0.005 |

Single crystals of MOG, $Sm_2(MoO_4)_3$, $Eu_2(MoO_4)_3$, $Tb_2(MoO_4)_3$ and $Dy_3(MoO_4)_3$ were cut in parallel with the {100}, {010} and {001} planes perpendicular with respect to the a, b and c axis, and an electric field or stress was applied to the crystal in order to produce a single domain therein. We call this process for producing single domain "polling". (Whether the single domain is produced or not can be observed by placing the single crystal beneath a polarization microscope, directing polarized light in the direction of the c axis and suitably manipulating the crossed nicols.) A 3-axis goniometer was used to measure the intensity distribution of the light reflected from the respective planes of the single crystal. The {400}, {600}, {800}, {1000}, {003}, {004} and {005} planes were used for the reflection of light. Then, an electric field of inverse polarity was applied to the single crystal in the direction of the c axis to interchange the a and b axis, and the refracted light from the {040}, {060}, {080} and {0100} planes was measured. In the measurement, a dispersing slit of 1°, a scattering slit of 1°, a light receiving slit of 0.1 mm and a Cu K$\alpha$ ray were used. The voltage and current applied to the X-ray source were 30 KV and 10 mA, respectively. The scanning rate of the goniometer was ¼ degree per minute and the Geiger counter has a radius of 185 mm. When the single crystal was then heated above the Curie temperature to release the polarized state, any appreciable difference was not present between the lattice parameters a and b.

The component of a novel crystal structure employed in the element according to the present invention is a single crystal of a chemical compound having a crystal structure of MOG and a solid solution of such a chemical compound. However, such a crystal structure is dependent upon the size of cations in the chemical compound. A different crystal structure results when the size of the cations is too large or too small. The Arrhenius ionic radii of the rare earth ions, $Sm^{+3}$, $Eu^{+3}$, $Gd^{+3}$, $Tb^{+3}$ and $Dy^{+3}$ are 1.00 A, 0.98 A, 0.97 A, 0.93 A and 0.92 A, respectively. Therefore, $(R_xR'_{1-x})_2O_3 \cdot 3Mo_{1-e}We O_3$ (where R and R' represent at least one of the rare earth elements, $x$ lies in the range of 0 to 1.0, and e lies in the range of 0 to 0.2) including the rare earth ions of such ion radii has a crystal structure isomorphous to that of MOG.

The chemical compound having a crystal structure of MOG employed in the present invention is of the orthorhombic symmetry and belongs to the point group mm2. The spontaneous strain xs of the chemical compound is given by $$xs = \frac{b - a}{a + b} > 5 \times 10^{-4}$$

and the chemical compound having such a unit cell and the same crystallographic symmetry exhibits an especially marked effect for polarization reversal. The properties of MOG employed in the present invention are enumerated as follows:

Color: Colorless and transparent
Density: 4600 kg/m³
Point group: Orthorhombic, mm2 (ferroelectric phase) at a temperature below the Curie point Tc. Tetragonal, 42 m (paraelectric phase) at a temperature above the Curie point Tc, and belonging to the ferroelectric-ferroelastic species 42 mF mm2.
Phase transition temperature (Tc): 162° ± 3°C.
Melting point: 1170°C.
Cleavage plane: {110}, {001}
Specific dielectric constant: $\epsilon c = 10.5$, $\epsilon a = \epsilon b = 9.5$ (at 20°C) $\epsilon a$, $\epsilon b$ and $\alpha c$ represent the specific dielectric constants in the directions of the a, b and c axis, respectively.
Spontaneous polarization: $1.86 \times 10^{-5}$ c/m² (at 20°C, in the direction of the c axis)
Spontaneous strain: $1.5 \times 10^{-3}$
Modulus of elasticity: $25 \times 10^{-12}$ $\left(\frac{m^2}{Newton}\right)$
Coersive field: $6 \times 10^5$ $\left(\frac{V}{m^2}\right)$ at 50 Hz
Coersive stress: $1.4 \times 10^5 \left(\frac{Newton}{m^2}\right)$
Electrical resistance: Above $10^{10}$ Ω·cm
Resistance to water and chemicals: Very strong
Tendency to efflorescence and deliquescence: None A method of making MOG employed in the present invention will be described hereunder.

EXAMPLE 1

Mixture of 361.8 grams of $Gd_2O_3$ and 431.7 grams of $MoO_3$ is pressed into a pellet type. The pellets of the said mixture are then placed in a crucible of platinum or in a crucible of alumina white being supported on a plate of platinum, and are heated at 700°C for 2 to 3 hours in an electric furnace. After finishing this solid state reaction, the pellets are taken out of the electric furnace, and ground into fine powder. Suitable quantity of the powder is pressed again into pellets. The pellets are placed in a crucible and are heated at 1000°C for 2 to 4 hours in the electric furnace. The result of observation of the product by an X-ray defractive method proved that the product had the crystal structure of MOG.

Subsequently, MOG in powder form is placed in a platinum crucible and is heated to melt at about 1190°C. A seed crystal of 3 mm × 3 mm in diameter and 30 mm in length is fixed to the pulling-up shaft with platinum ribbon is then soaked in the melt of MOG and the temperature is gradually reduced until the melt solidifies on the seed. In this case, the input to the induction coil is increased until the seed crystal attains a diameter of about 2 mm, during the pulling-up shaft is rotated at a rate of 30 to 60 revolutions per minute. The input to the furnace is then reduced until the crystal growing on the seed of 2 mm in diameter attains a diameter of about 10 to 20 mm. The pulling rate in this case is 18 to 1.5 mm per hour as in the above case and the input is adjusted so that the diameter of the crystal lies in a fixed range of 10 to 20 mm. When the length of the pulled-up crystal reaches a desired value of 30 to 70 mm, the input to the furnace is increased again to reduce the diameter of the succeeding crystal portion in the melt and the crystal is pulled up in somewhat rapidly and cut off the remaining crystal portion in the melt. The crystal thus obtained is placed in an afterheater and the temperature is reduced at a rate of 50° to 100°C per hour to prevent the cracks from developing in the crystal. A single crystal of MOG can be obtained by the above steps. The lattice parameters of single crystal of MOG thus obtained has measured after poling and obtained in the previously described values.

Crystallographic isomers having the crystal structure of MOG preferably employed in the present invention are enumerated in Table 3. The compounds ranging from Example 2 to Example 2 can be made by a method of crystal growth analogous to the method described in Example 1, and the reacting components in the amounts specified in the second column of Table 3 are heated at a temperature below the melting point of each compound to form a solid solution. These compounds are then heated up and processed according to the steps described in Example 1, and single crystals are pulling up from the melt respectively.

Table 3

| Example | Chemical formula of single crystal | Reacting components (mixing ratio) | |
|---|---|---|---|
| | | Molybdate | Rare earth oxide |
| 2 | $Sm_2(MoO_4)_3$ | 431.8 | $(Sm_2O_3)$ 348.7 |
| 3 | $Eu_2(MoO_4)_3$ | 431.8 | $(Eu_2O_3)$ 352.0 |
| 4 | $Dy_2(MoO_4)_3$ | 431.8 | $(Dy_2O_3)$ 373.0 |
| 5 | $Tb_2(MoO_4)_3$ | 833.6 | $(Tb_2O_3)$ 748.8 |
| 6 | $(Gd_{0.5}Sm_{0.5})_2(MoO_4)_3$ | 431.8 | $(Gd_2O_3)$ 180.9 $(Sm_2O_3)$ 174.3 |
| 7 | $(Gd_{0.5}Eu_{0.5})_2(MoO_4)_3$ | 431.8 | $(Gd_2O_3)$ 180.9 $(Eu_2O_3)$ 176.0 |
| 8 | $(Gd_{0.5}Tb_{0.5})_2(MoO_4)_3$ | 431.8 | $(Gd_2O_3)$ 180.9 $(Tb_2O_3)$ 187.2 |
| 9 | $(Gd_{0.5}Dy_{0.5})_2(MoO_4)_3$ | 431.8 | $(Gd_2O_3)$ 180.9 $(Dy_2O_3)$ 186.5 |
| 10 | $(Gd_{0.95}Yb_{0.05})_2(MoO_4)_3$ | 431.8 | $(Gd_2O_3)$ 343.7 $(Yb_2O_3)$ 19.7 |
| 11 | $(Gd_{0.95}Ho_{0.05})_2(MoO_4)_3$ | 431.8 | $(Gd_2O_3)$ 343.7 $(Ho_2O_3)$ 18.9 |
| 12 | $(Gd_{0.95}Lu_{0.05})_2(MoO_4)_3$ | 431.8 | $(Gd_2O_3)$ 343.7 $(Lu_2O_3)$ 19.9 |
| 13 | $(Gd_{0.95}Tm_{0.05})_2(MoO_4)_3$ | 431.8 | $(Gd_2O_3)$ 343.7 $(Tm_2O_3)$ 19.3 |
| 14 | $(Gd_{0.95}Sc_{0.05})_2(MoO_4)_3$ | 431.8 | $(Gd_2O_3)$ 343.7 $(Sc_2O_3)$ 6.9 |
| 15 | $(Gd_{0.95}La_{0.05})_2(MoO_4)_3$ | 431.8 | $(Gd_2O_3)$ 343.9 $(La_2O_3)$ 16.3 |
| 16 | $(Gd_{0.95}Pr_{0.05})_2(MoO_4)_3$ | 431.8 | $(Gd_2O_3)$ 343.9 $(Pr_6O_{11})$ 17.0 |
| 17 | $(Gd_{0.6}Y_{0.4})_2(MoO_4)_3$ | 431.8 | $(Gd_2O_3)$ 217.0 $(Y_2O_3)$ 90.3 |
| 18 | $(Gd_{0.6}La_{0.4})_2(MoO_4)_3$ | 431.8 | $(Gd_2O_3)$ 217.0 $(La_2O_3)$ 130.8 |
| 19 | $(Gd_{0.6}Tb_{0.2}Dy_{0.2})_2(MoO_4)_3$ | 431.8 | $(Gd_2O_3)$ 217.0 $(Dy_2O_3)$ 74.6 $(Tb_4O_7)$ |

Table 3-continued

| Example | Chemical formula of single crystal | Reacting components (mixing ratio) | |
|---|---|---|---|
| | | Molybdate | Rare earth oxide |
| 20 | $(Gd_{0.7}Eu_{0.2}Dy_{0.1})_2(MoO_4)_3$ | 431.8 | 78.8 $(Gd_2O_3)$    $(Eu_2O_3)$ 253.3    70.4 <br> $(Dy_2O_3)$ 37.3 |
| 21 | $(Gd_{0.6}Sm_{0.2}Tb_{0.1})_2(MoO_4)_3$ | 431.8 | $(Gd_2O_3)$    $(Sm_2O_3)$ 217.0    69.7 <br> $(Tb_4O_7)$ 39.4 |
| 22 | $(Gd_{0.7}Eu_{0.2}Tb_{0.1})_2(MoO_4)_3$ | 431.8 | $(Gd_2O_3)$    $(Eu_2O_3)$ 253.3    70.4 <br> $(Tb_4O_7)$ 39.4 |
| 23 | $(Gd_{0.7}Y_{0.2}La_{0.1})_2(MoO_4)_3$ | 431.8 | $(Gd_2O_3)$    $(La_2O_3)$ 253.3    32.6 <br> $(Y_2O_3)$ 45.2 |
| 24 | $(Gd_{0.7}Eu_{0.2}Ho_{0.1})_2(MoO_4)_3$ | 431.8 | $(Gd_2O_3)$    $(Eu_2O_3)$ 253.3    70.4 <br> $(Ho_2O_3)$ 37.8 |
| 25 | $(Gd_{0.7}Sm_{0.1}Eu_{0.1}Y_{0.1})_2(MoO_4)_3$ | 431.8 | $(Gd_2O_3)$    $(Sm_2O_3)$ 253.3    34.9 <br> $(Eu_2O_3)$    $(Y_2O_3)$ 35.2    22.6 |
| 26 | $(Gd_{0.95}Nd_{0.05})_2(MoO_4)_3$ | 431.8 | $(Gd_2O_3)$    $(Nd_2O_3)$ 343.7    16.8 |
| 27 | $(Gd_{0.6}Tb_{0.2}Y_{0.1}La_{0.1})_2(MoO_4)_3$ | 431.8 | $(Gd_2O_3)$    $(Tb_4O_7)$ 217.0    78.8 <br> $(Y_2O_3)$    $(La_2O_3)$ 22.6    32.6 |
| 28 | $Gd_2(Mo_{0.95}W_{0.05}O_4)_3(MoO_4)_3$ | 431.8 | $(Gd_2O_3)$    $(WO_3)$ 280    70.0 |
| 29 | $(Sm_{0.5}Eu_{0.5})_2(MoO_4)_3$ | 431.8 | $(Sm_2O_3)$    $(Eu_2O_3)$ 174.1    176.0 |
| 30 | $(Sm_{0.5}Dy_{0.5})_2(MoO_4)_3$ | 431.8 | $(Sm_2O_3)$    $(Dy_2O_3)$ 174.1    186.5 |
| 31 | $(Sm_{0.5}Tb_{0.5})_2(MoO_4)_3$ | 431.8 | $(Sm_2O_3)$    $(Tb_4O_7)$ 174.1    187.5 |
| 32 | $(Sm_{0.95}Yb_{0.05})_2(MoO_4)_3$ | 431.8 | $(Sm_2O_3)$    $(Yb_2O_3)$ 331.3    18.7 |
| 33 | $(Sm_{0.95}Ho_{0.05})_2(MoO_4)_3$ | 431.8 | $(Sm_2O_3)$    $(Ho_2O_3)$ 331.3    18.9 |
| 34 | $(Sm_{0.95}Lu_{0.05})_2(MoO_4)_3$ | 431.8 | $(Sm_2O_3)$    $(Lu_2O_3)$ 331.3    19.9 |
| 35 | $(Sm_{0.95}Tm_{0.05})_2(MoO_4)_3$ | 431.8 | $(Sm_2O_3)$    $(Tm_2O_3)$ 331.3    19.3 |
| 36 | $(Sm_{0.95}Sc_{0.05})_2(MoO_4)_3$ | 431.8 | $(Sm_2O_3)$    $(Sc_2O_3)$ 331.3    6.9 |
| 37 | $(Sm_{0.95}Y_{0.05})_2(MoO_4)_3$ | 431.8 | $(Sm_2O_3)$    $(Y_2O_3)$ 331.3    11.3 |
| 38 | $(Sm_{0.9}Er_{0.1})_2(MoO_4)_3$ | 431.8 | $(Sm_2O_3)$    $(Er_2O_3)$ 313.4    19.1 |
| 39 | $(Sm_{0.6}Eu_{0.3}Er_{0.1})_2(MoO_4)_3$ | 431.8 | $(Sm_2O_3)$    $(Eu_2O_3)$ 209.4    105.4 <br> $(Er_2O_3)$ 19.1 |
| 40 | $(Sm_{0.7}Tb_{0.2}Y_{0.1})_2(MoO_4)_3$ | 431.8 | $(Sm_2O_3)$    $(Tb_4O_7)$ 244.0    78.8 <br> $(Y_2O_3)$ 22.6 |
| 41 | $(Sm_{0.8}Er_{0.1}Y_{0.1})_2(MoO_4)_3$ | 431.8 | $(Sm_2O_3)$    $(Y_2O_3)$ 278.9    22.6 <br> $(Er_2O_3)$ |

Table 3-continued

| Example | Chemical formula of single crystal | Reacting components (mixing ratio) | |
|---|---|---|---|
| | | Molybdate | Rare earth oxide |
| 42 | $(Sm_{0.8}Dy_{0.1}Y_{0.05}Er_{0.05})_2(MoO_4)_3$ | 431.8 | 19.1 (Sm$_2$O$_3$)    (Dy$_2$O$_3$) 278.9    37.3<br>(Y$_2$O$_3$)    (Er$_2$O$_3$)<br>11.3    9.5 |
| 43 | $(Sm_{0.5}Tb_{0.5})_2(Mo_{0.9}W_{0.1})_3$ | 388.6 | (WO$_3$)    (Sm$_2$O$_3$)<br>70.0    174.1<br>(Tb$_4$O$_7$)<br>187.2 |
| 44 | $(Dy_{0.95}La_{0.05})_2(MoO_4)_3$ | 431.8 | (Dy$_2$O$_3$)    (La$_2$O$_3$)<br>369.3    16.3 |
| 45 | $(Dy_{0.95}Pr_{0.05})_2(MoO_4)_3$ | 431.8 | (Dy$_2$O$_3$)    (Pr$_6$O$_{11}$)<br>369.3    17.0 |
| 46 | $(Dy_{0.95}Nd_{0.05})_2(MoO_4)_3$ | 431.8 | (Nd$_2$O$_3$)    (Dy$_2$O$_3$)<br>16.8    369.3 |
| 47 | $(Dy_{0.8}Nd_{0.1}Ho_{0.1})_2(MoO_4)_3$ | 431.8 | (Dy$_2$O$_3$)    (Ho$_2$O$_3$)<br>298.4    37.8<br>(Nd$_2$O$_3$)<br>33.7 |
| 48 | $(Eu_{0.6}Tb_{0.25}Dy_{0.2})_2(MoO_4)_3$ | 431.8 | (Eu$_2$O$_3$)    (Dy$_2$O$_3$)<br>211.2    74.6<br>(Tb$_4$O$_7$)<br>102.4 |
| 49 | $(Gd_{0.5}Eu_{0.2}Sm_{0.1}Tb_{0.1}Dy_{0.1})_2(MoO_4)_3$ | 431.8 | (Gd$_2$O$_3$)    (Sm$_2$O$_3$)<br>217.0    34.9<br>(Dy$_2$O$_3$)    (Eu$_2$O$_3$)<br>37.3    70.4<br>(Tb$_4$O$_7$)<br>39.4 |

Figure 5:
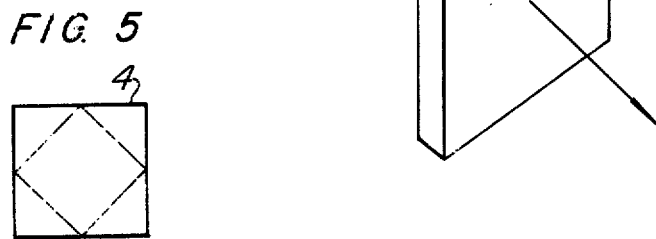
FIGS. 5, 5a, 5b, 5c and 5d are schematic views showing the lattice deformation caused in an irregular ferroelectric crystal through the phase transition temperature from paraelectric phase into the ferroelectric phase.
Figures 5A, 5B, 5C, 5D:
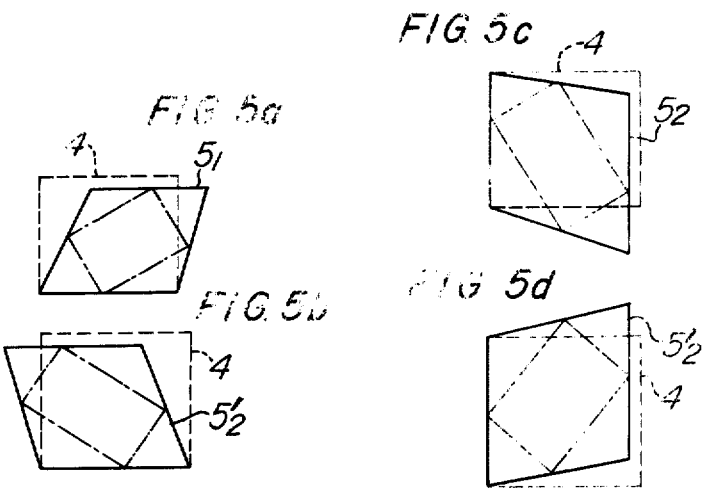

According to the investigation performed by the inventors, a unit cell of an irregular ferroelectric crystal has bistable deformations relatively alternatable below the Curie temperature Tc at which temperature phase transition from the paraelectric phase to the ferroelectric phase occurs. For example, a single crystal of MOG is composed of tetragonal lattices 4 in the paraelectric phase as shown in FIG. 5, but this tetragonal lattice 4 is deformable into four kinds of lattices $S_1$, $S_1'$, $S_2$ and $S_2'$ in the ferroelectric phase as shown in FIGS. 5a, 5b, 5c and 5d, respectively. These four kinds of lattices can be classified into two sets of lattices, that is, a set of lattices $S_1$ and $S_1'$, and a set of lattices $S_2$ and $S_2'$, which are relatively switchable by the polarization reversal. In each set of lattices, switching from one stable state to the other stable state occurs in response to application of an electric field of inverse polarity stronger than the coercive field. In this case, not only the switching of the spontaneous strain but also a reversal of the spontaneous polarization takes place, of course. Although these four kinds of lattices occur randomly in the crystal, the lattices of the same polarization grow in the same domain as shown in FIGS. 6a and 6b in response to application of an external voltage or stress to the crystal and the lattices of one polarization and lattices state border the lattices of the other polarization and lattice state by a domain wall. With an increase in the external voltage, the lattices in the domain of the inverse polarity are affected by the external voltage and the polarization is reversed together with the lattice deformation with the result that the domain wall moves in a normal direction toward the domain of opposite polarization. The domain wall which moves in response to the application of voltage ceases its motion and is kept stationary at the position when the application of the voltage is interrupted. It is therefore possible to control the motion of the domain wall, that is, to cause forward and backward motion and to stop the motion of the domain wall as desired by controlling the application of voltage or stress.

The possibility of occurrence between two sets of lattices of $S_1$ or $S_1'$ and $S_2$ or $S_2'$ is equal. In some cases, however, a domain pattern may possibly appear in which the domains $S_1$, $S_1'$ and $S_2$, $S_2'$ cross at right angles with each other as shown in FIG. 6c and FIG. 7. Such a domain pattern is objectionable because any further growth of the domains results in FIG. 7 that the domains impart a force to each other at the boundary or at the cross-point therebetween until finally the crystal itself would begin to separate.

In the single crystal of MOG, nuclei of domains (hereinafter to be referred to merely as nuclei) emerge to form a single domain wall configuration and the nuclei have the tendency to grow in the direction normal to the domain wall. When, for example, a D.C. voltage of about 100 V is applied to a single crystal 3 of MOG 10 mm long, 10 mm wide and 0.34 mm thick which is a Z-plate or cut in the direction parallel to the {001} plane for producing the nuclei in the single crystal, the domains $S_1$, $S_2$, $S_1'$ and $S_2'$ grow in the direction perpendicular with respect to the <110> direction of the crystal plate 3 as shown in FIG. 7 and the nuclei impart a force to each other as they grow. Thus, the nuclei cannot grow any further and an attempt to promote the growth by raising the voltage to a very high value tends to break the crystal plate 3.

Therefore, it is very important to secure the single wall motion. The present invention eliminates the objectionable growth of the nuclei crossing at right angles with each other and to secure the single wall motion.

Various preferred embodiments of the present invention will now be described in detail with reference to the drawings.

EXAMPLE 1 a. A single crystal Z-plate 3 of MOG 10 mm long, 10 mm wide and 0.34 mm thick is cut in parallel with the {001} plane and the opposite surfaces of the crystal plate 3 are polished to optical flatness. The crystal plate 3 is heated up to about 500°C and plated with transparent electrodes. Tin chloride (Sn Cl$_4$) is sprayed onto the opposite surfaces of the crystal plate 3 to provide a pair of transparent NESA electrodes 6 thereon. b. The single crystal plate 3 of MOG is rendered to have a multi-domain configuration when the temperature is gradually decreased to room temperature.

c. The peripheral sides of the single crystal plate 3 of multi-domain configuration obtained in this manner are cleaved by a laser knife utilizing the cleavage of the crystal so as thereby to remove the short-circuiting portions between the upper and lower transparent electrodes 6.

d. Then, as shown in FIG. 8a, a D.C. voltage of 100 V is applied across the upper and lower transparent electrodes 6 disposed on the single crystal plate 3 of MOG thus obtained so as to produce a single domain structure throughout the crystal plate 3.

e. Subsequently, as shown in FIG. 8 and FIGS. 8a–8e, parafin, wax, a plastic tape or painting-ink 7 of an electrically insulating nature having a sufficient resistance to an aqueous solution of salt is coated on the transparent electrodes 6 with the exception of a portion 6a adjacent to one end edge of the upper electrode 6 along a direction of a domain wall, that is, along the <110> direction in the case of the Z-plate of MOG. Then, when the negative D.C.-voltage of 6 V is applied to the upper transparent electrodes 6 and the positive electrode is dipped in an aqueous solution of salt, the exposed electrode portion 6a is gradually etched away as shown in FIG. 8b. The distribution of domains or polarities in the single crystal plate 3 of MOG treated in the manner described above is determined by the polarities of the applied voltage as shown in FIG. 8c.

f. Then, the portion of the electrode protecting film in the form of parafin, wax, plastic tape or painting-ink covering a transparent electrode portion 6b at the end opposite to the portion 6a is removed and the upper electrode 6 is dipped in the aqueous solution of salt after the polarization reversal is performed only in an electroded portion by applying a voltage of opposite polarity across the electrodes 6. As a result, the electrode portion 6b is gradually etched away to provide an irregular ferroelectric element adapted for single domain-wall motion in which a nucleus 3a of one polarization and a nucleus 3b of opposite polarization are disposed on opposite sides of the Z-plate defined as seen in FIGS. 8e and 8.

As will be apparent from the above description, the irregular ferroelectric element for controllable single-domain is provided with the nuclei of polarities opposite to each other on opposite sides of the periphery of Z-plate. Thus, when a voltage is applied across the electrodes, the nucleus of polarity equal to the polarity of the applied voltage grows gradually towards the opposite side of the crystal plate until it extends to the boundary of the nucleus of opposite polarity adjacent to the other end. When, conversely, a voltage of opposite polarity is applied across the electrodes, the nucleus of polarity equal to the polarity of the applied voltage grows gradually and the domain of opposite polarity to the applied voltage is gradually extinguished. It is thus possible to freely control the growth and exhaustion of the domains of polarities opposite to each other. The boundary or domaian wall between the domains of opposite polarities is very clear-cut and flat plane and moves always along the <110> direction. Further, due to the fact that such an irregular ferroelectric element includes already the nuclei therein, application of a far smaller voltage can easily cause the domain wall motion by the growing of the nucleus of one polarity than when such a nucleus is newly grown in a Z-plate having no nucleus therein.

The irregular ferroelectric element for controllable single-domain of this structure has many advantages. First, the element can be securely fixed to a support without adversely affecting the reversal of polarization because no reversal of polarization, hence no lattice deformation, occurs in the nucleus portion. Secondly, the positive and negative domains grow depending on the polarity of applied voltage and therefore the direction of domain growth is determined by the polarity of the applied voltage. It is thus possible to obtain a ferroelectric element which is hardly cracked even when it is used for a high-speed continuous switching operation. Thirdly, the polarization reversal can be initiated with a small applied voltage since the element includes the nuclei therein and requires no nucleation of reversed domain.

EXAMPLE 2

A Z-plate of 3 MOG single crystal 6 mm long, 2 mm wide and 2 mm thick is subject to steps similar to those described in Example 1 to produce a pair of positive and negative domains at longitudinally opposite ends of the single crystal bar as shown in FIG. 9a. In this element, the reversal of the spontaneous polarization takes place easily in response to application of pressure thereto. Pressure is applied by the application of a force along the a or b axis, designated by the arrows $f'$ and $f$, respectively, from a mechanical force applying means 10′. Portions 3a and 3b of an upper electrode 6 are removed along the <110> direction of the single crystal plate 3 as shown in FIG. 9b.

EXAMPLE 3

A single crystal plate 3 of MOG is treated according to steps similar to the steps (a), (b) and (c) described in Example 1, and a photo-resist film 7′ is coated on each of transparent NESA electrodes 6 deposited on the crystal plate 3 as shown in FIG. 10a. A mask 8 is then placed on the upper transparent electrode 6 as shown in FIG. 10b. After exposure, the non-sensitized portions of the photo-resist film 7′ are removed and alternate transparent electrode portions overlying the non-sensitized photo-resist film portions are removed by electrolysis while applying a positive voltage thereto. Then, the remaining transparent electrode portions overlying the non-sensitized photo-resist film portions are removed while applying a voltage of a sign opposite to the above voltage to obtain a ferrelectric element having such a domain configuration that the nuclei of positive and negative polarization are alternately arranged as seen in FIG. 10c.

EXAMPLE 4

A Z-plate of a single crystal 3 of MOG 10 mm long, 10 mm wide and 0.34 mm thick is cut at the sides thereof in parallel with the <110> direction. The portion adjacent to one end 3a of the single crystal plate 3 is securely fixed to a base plate 8 of material such as glass by a binder 9 such as an epoxy resin binder over a width of about 2 mm as shown in FIG. 11. Transparent electrodes 6 of $SnO_2$ are disposed on the Z-plates of the single crystal plate 3 and a voltage is applied across the electrodes 6 so that the crystal plate 3 has a single domain configuration. Then, the portion adjacent to the opposite end 3b of the crystal plate 3 is firmly secured to the glass plate 8 by the same binder 9 over a width of about 2 mm.

While Examples 1, 2 and 4 have referred to an irregular ferroelectric element in which nuclei for growing the domains of opposite polarities are produced at opposite ends of a crystal plate, an irregular ferroelectric element in which a nucleus for growing a domain of one polarity is disposed at one end only of a crystal plate can also be made.

Some embodiments utilizing such a ferroelectric element for controllable single-domain will be described hereunder.

EXAMPLE 5

As shown in FIG. 12a, a triangular shaped Z-plate 3 of MOG which is 10 mm long at the two sides and 14 mm long at the base and has a thickness of 0.34 mm is prepared. A method similar to that described in Example 1 is employed to produce a nucleus of one polarity at an apex portion 3a between the two sides in parallel with the <110> direction and a nucleus of opposite polarization at a base portion 3b also in parallel with the <110> direction. Four such crystal plates 3 are assembled so that their apices 3a are in registration with each other at the same center O as shown in FIG. 12b. Transparent electrodes 6 of $SnO_2$ are disposed on the Z-planes of the assembly and a D.C. power supply 10 at 150 V is connected to the transparent electrodes 6 to constitute an electrically controlled shutter unit for transmitted light.

The electrically controlled shutter unit 3 is interposed together with a quarter-wave plate 3' between a polarizer 1 and an analyzer 2 as shown in FIG. 12c. The polarizer 1 and analyzer 2 are so arranged placed that their planes of polarization cross at right angles with each other (crossed polar) and are interposed in an optical path of a lens system or any other optical system. When a voltage of a polarity the same as the polarity of the nucleus 3a is applied to the elctrically controlled shutter unit $3_1$, the domain-wall of the nucleus 3a moves in the directions of the arrows shown in FIG. 12b so that light beam can be transmitted through this portion. When, conversely, a voltage of a polarity the same as the polarity of the nucleus 3b is applied to the electrically controlled shutter unit, the domain-wall moves in the directions opposite to the arrows in FIG. 12b so that light transmission is diminished and the total amount of light transmitted through this portion is reduced. Thus, the element can be used as a sort of iris stop.

This shutter, when placed at the position of an iris stop in an optical system, can serve as a perfect stop element for causing a uniform change of the amount of light intensity throughout the entire surface of a picture.

EXAMPLE 6

A Z-plate 3 of MOG single crystal 10 mm long, 10 mm wide and 0.34 mm thick is cut at the four sides in the <110> direction, and a central nucleus 3a and a pair of nuclei of opposite polarity are formed at the center and opposite ends, respectively, of the crystal plate 3 as shown in FIG. 13 according to a method similar to that described in Example 1. Transparent electrodes 6 of $SnO_2$ are deposited on the Z-planes of the crystal plate 3 and a supply 10 of control voltage is connected to the transparent electrodes 6 to constitute an optical slit element.

When a voltage of a polarity the same as the polarity of the nucleus 3a is applied across the transparent electrodes 6 from the power supply 10, the domain-walls W move in the directions of the arrows, while when a voltage of polarity opposite to the polarity of the nucleus 3a is applied, the domain-walls W move in the directions opposite to the arrows. Further, the direction of revolution of polarized light transmitted through the region of the nucleus 3a is opposite to the direction of revolution of polarized ligth transmitted through the remaining regions. Therefore, the combination of this optical slit element and a quarter-wave plate 3' usable in the visible spectrum range may be interposed between a polarizer 1 and an analyzer 2 having their planes of polarization crossed at right angles with respect to each other in a manner as shown in FIG. 12c thereby to obtain a sort of optical slit apparatus. In such an optical slit apparatus, there occurs no displacement of the center of the optical axis because the nucleus 3a grows and contracts equally in the transverse direction. Further, due to the fact that the nucleus 3a is in band form and the change in the shape of the domain 3a takes place in the unit cells, the element constitutes an optical slit of very high precision.

EXAMPLE 7

Two optical slit elements $3_1$ and $3_2$ of the kind described in Example 6 are vertically disposed on the same optical axis in such a manner that their central nuclei cross at right angles with respect to each other and their transparent NESA electrodes are connected in parallel with a power supply as shown in FIG. 14. When a voltage of a polarity the same as the polarity of the central nuclei of the elements is applied across the transparent electrodes, the domain-walls move in the directions of the arrows shown in FIG. 14, while when a voltage of polarity opposite to the polarity of the central nuclei is applied, the domain-walls move in the directions opposite to the arrows. Thus, the direction of revolution of the plane of polarization for light transmitted through the nucleus regions of these two optical slit elements is opposite to the direction of revolution of the plane of polarization for light transmitted through the remaining regions of the optical slit elements $3_1$ and $3_2$. An electrically controlled shutter can be constituted by combining these two optical slit elements $3_1$ and $3_2$ in series with quarter-wave plates and disposing the combination in a system including a polarizer 1 and an analyzer 2 whose vibrational planes of polarization are parallel to each other and a polarizer 3'' whose vibrational plane of polarization crosses at right angles with the plane of polarization of the former

EXAMPLE 8

Figure 15:
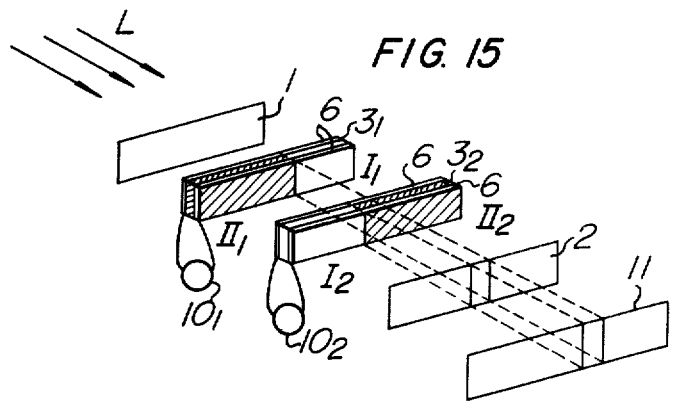
FIG. 15 shows the structure of another form of the electrically controlled shutter for transmitted light employing two irregular ferroelectric elements according to the present invention.
Figure 15A:
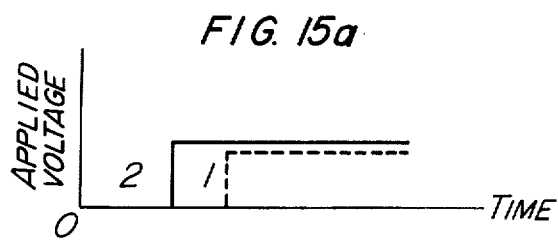
FIG. 15a is a graph showing the time function of voltage applied to the irregular ferroelectric elements in the shutter shown in FIG. 15.

Single crystal plates $3_1$ and $3_2$ of MOG which are Z-plates and cut at the four sides in parallel with the <110> direction so as to serve as quarter-wave plates for visible light are provided with transparent NESA electrodes 6 and are formed with nuclei $I_1$, $II_1$, $I_2$ and $II_2$ of polarities opposite to each other at opposite ends according to a method similar to that described in Example 1. The respective sets of the transparent electrodes 6 on the electrically controlled shutter elements $3_1$ and $3_2$ thus prepared are connected to power supplies $10_1$ and $10_2$, respectively. The elements $3_1$ and $3_2$ are arranged so that their Z-planes are perpendicular with respect to the optical axis and the nuclei $I_1$ and $II_1$ of the element $3_1$ are opposite to the nuclei $II_2$ and $I_2$ of the element $3_2$ as seen in FIG. 15. The combination of the elements $3_1$ and $3_2$ is interposed between a polarizer 1 and an analyzer 2 so disposed that their planes of polarization cross at right angles with each other. Then, when control voltages are applied across the transparent NESA electrodes 6 from the power supplies $10_1$ and $10_2$, the retardations of light transmitted through the polarizer 1 and then through the elements $3_1$ and $3_2$ are added to each other or substracted from each other as the domain growth proceeds in the elements $3_1$ and $3_2$. Therefore, the light transmitted through the elements $3_1$ and $3_2$ and the analyzer 2 can be observed as a motion of a bright portion through a dark portion on a screen 11. It is to be noted that the voltages are applied to the respective sets of the transparent NESA electrodes 6 with a time delay of the kind as shown in FIG. 15a.

When the polarity of the applied voltage is reversed upon extension of the light-transmitting regions $II_1$ and $II_2$ of the elements $3_1$ and $3_2$ to the boundary of the nucleus of the opposite polarity, the moving direction of the lighttransmitting domains is reversed so that the bright portion on the screen 11 moves in the reverse direction.

A bright spot moving substantially cyclically in one direction on the screen 11 can be observed when the voltages applied to the elements $3_1$ and $3_2$ have a difference in magnitude depending on the polarity thereof so that there is a difference between the rates of growth of each light-transmitting region $II_1$, $II_2$ depending on the moving direction, that is, the rate of growth is slow in one direction but rapid in the reverse direction.

EXAMPLE 9

Figure 16:
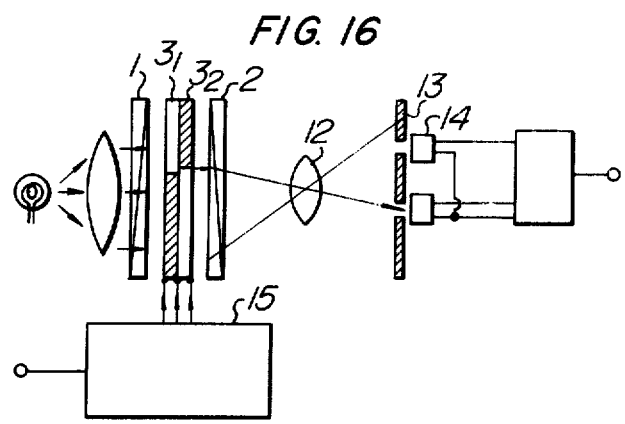
FIG. 16 shows the structure of an optical pulse generator employing the shutter shown in FIG. 15.

Referring to FIG. 16, the light transmitted through an apparatus as shown in FIG. 15 is focused by a lens 12 to be projected onto a plurality of photomultipliers 14 disposed behind a mask 13, and an input signal is supplied to a means 15 so that a voltage delivered from the means 15 is applied to the transparent NESA electrodes 6 of the electrically controlled shutter elements $3_1$ and $3_2$. A positive or negative domain grows in the elements $3_1$ and $3_2$ in response to an external input signal, and an optical signal transmitted through the light-transmitting regions of the elements $3_1$ and $3_2$ to reach the mask 13 is converted into an electrical signal by the photomultipliers 14. This apparatus serves as a sort of optical pulse generator.

EXAMPLE 10

Figure 17:
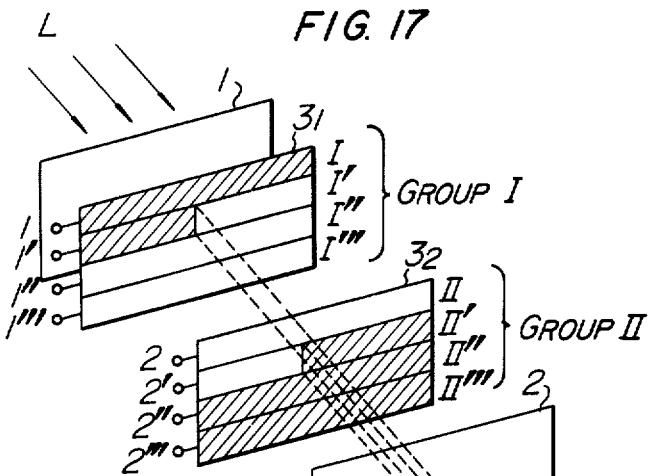
FIG. 17 shows the structure of a two-dimensional flying spot scanner employing a plurality of groups of irregular ferroelectric elements according to the present invention.

Referring to FIG. 17, a plurality of elements $3_1I$, $3_1I'$, $3_1I''$ and $3_1I'''$ and a plurality of elements $3_2II$, $3_2II'$, $3_2II''$ and $3_2II'''$ of the kind shown in FIG. 15 are stacked up vertically in tiers to constitute two groups of shutter elements I and II. These elements are so arranged that the domain wall of the nucleus in the uppermost element extends first toward the nucleus of the opposite polarity and then similar growth of the nucleus in the successive elements is started. These two shutter element groups I and Ii are interposed between a polarizer 1 and an analyzer 2 whose vibrational planes of polarization cross at right angles with respect to each other. A screen 11 can be two-dimensionally scanned with a flying spot when light is projected onto the apparatus and voltages are successively applied to the elements.

EXAMPLE 11

Figure 18:
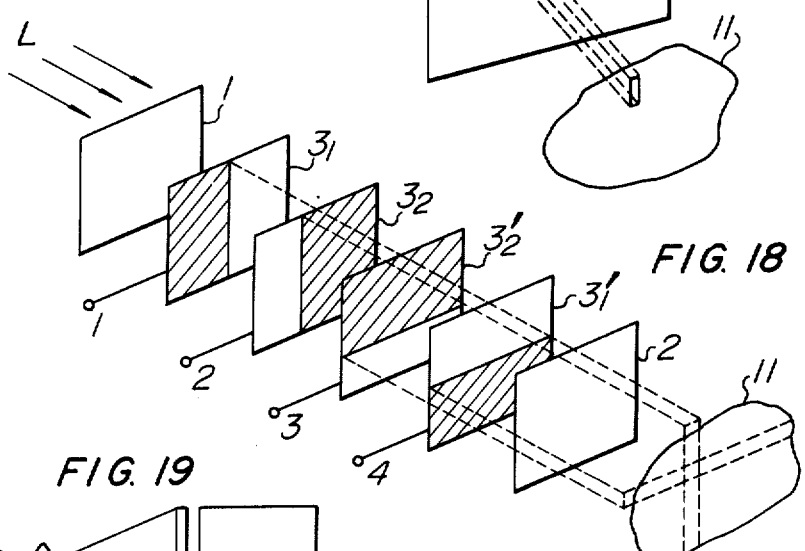
FIG. 18 is an explanatory view illustrating the structure and operating principle of another two-dimensional flying spot scanner employing a plurality of irregular ferroelectric elements according to the present invention.

Referring to FIG. 18, elements $3_1$, $3_2$, $3_2'$ and $3_1'$ are similar to those described in Example 9 but have a thickness of about 0.16 mm which is half the thickness of the elements shown in FIG. 16 so that they act as ⅛-wave plates. These elements $3_1$, $3_2$, $3_2'$ and $3_1'$ are interposed between a polarizer 1 and an analyzer 2 whose vibrational planes of polarization cross at right angles with each other, and the elements $3_2'$ and $3_1'$ are disposed in such a relation that they are rotated relative to the elements $3_1$ and $3_2$ through a certain angle of, for example, 90° in the planes perpendicular with respect to the light beam. Voltages of different periods from each other are applied to the transparent NESA electrodes of the respective elements so that the transmitted image of light L entering this apparatus can move two-dimensionally on a screen 11.

Figure 19:
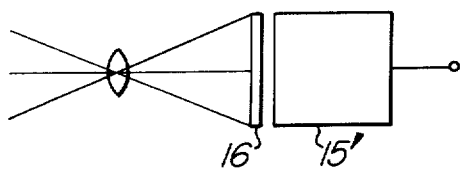
FIG. 19 shows the structure of an image generator employing the two-dimensional flying spot scanner shown in FIG. 18.
Figure 20:
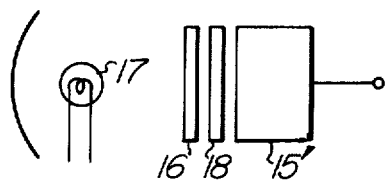
FIG. 20 shows the structure of another image generator employing the two-dimensional flying spot scanner shown in FIG. 18.

The electrically controlled shutter for transmitted light described in Example 8 can be utilized as a focal plane shutter for cameras so that exposure at high speed can be carried out by varying the moving rate and width of the slit. Further, in the two-dimensional flying spot scanner described in Examples 10 and 11, the horizontal and vertical scanning intervals of the flying spot can be controlled by the horizontal and vertical synchronizing pulses for a television. Therefore, as shown in FIG. 19, a real image of an object may be focused on a flying spot screen 16 (the screen 11 in Examples 10 and 11) so that the output from the screen 16 can be converted into an electrical signal by means of a photomultiplier device 15'. In another application as shown in FIG. 20, a beam of light from a light source 17 is passed through a flying spot screen 16 and the light transmitted through a slide 18 is converted into an electrical signal by means of a photomultiplier device 15'. In a further application as shown in FIG. 20a, light passed through a flying spot screen 16 is used to scan an object 18' and the light reflected from the object 18' is sensed by a photomultiplier device 15' for detection. In another application as shown in FIG. 21, the intensity of a light beam from light source 17 is modulated by a picture signal 19 and the modulated light is passed through a flying spot screen 16 for the reproduction of the picture.

EXAMPLE 12

Referring to FIGS. 22a and 22b, a Z-plate 3 of MOG single crystal 20 mm long, 15 mm wide and 0.33 mm thick is cut at the four sides in parallel with the <110> direction and has its Z-planes polished to optical flatness. Transparent electrodes 6 consisting essentially of $SnO_2$ are deposited on the Z-planes at about 500°C, and then the opposite end edge portions 3a and 3b of the transparent NESA electrodes 6 are removed over a width of 1 mm by a method similar to that described in Example 1. A positive nucleus and a negative nucleus are formed in the crystal plate 3 at portions corresponding to the portions 3a and 3b, respectively, and the upper and lower electrodes 6 are connected to a power supply by lead-wires. The Z-plate 3 of MOG single crystal having the above thickness acts apparently as a quarter-wave plate over the entire visible spectrum range. The combination of the Z-plate 3 of MOG single crystal and a commercial quarter-wave plate 3' is interposed between a polarizer 1 and an analyzer 2 whose vibrational planes of polarization cross at right angles with each other as shown in FIG. 23. When a light-beam from a xenon lamp L is projected onto the apparatus and transmitted through the above plates to enter a slide projector 20, a picture can be obtained on a screen 11.

Application of a positive voltage to the element 3 causes gradual growth of the positive domain from the positive nucleus, and the retardations are added to each other and subtracted from each other, respectively, in the portions of light transmitted through the positive domain and the negative domain and then through a quarter-wave plate 3'. Thus, the image formed on the screen 11 can be partly erased.

The electrically controlled shutter may be disposed in place of the iris stop element in the optical system of a camera or slide projector so as to uniformly vary the amount of light over the entire area.

EXAMPLE 13

A Z-plate 3 of MOG single crystal is processed to the form shown in FIGS. 22a and 22b and is combined with five commercial half-wave plates 3'' as shown in FIG. 24. The combination is interposed between a polarizer 1 and an analyzer 2 whose vibrational planes of polarization cross at right angles with each other. A light-beam emitted from a light source L is transmitted through the apparatus and a slide projector 21 to form an image on a screen 11. The half-wave plates 3'' are provided with a pattern as shown in FIG. 24a. More precisely, the face portion is cut out in the first half-wave plate, the bottom portion is cut out in the first and second half-wave plates, and the hair, eyes and other portions are painted in black. Thus, the background of the picture is formed by the five half-wave plates, the face portion is formed by the four half-wave plates, and the bottle portion is formed by the three half-wave plates.

The positive or negative domain grows in the crystal plate 3 of MOG depending on the polarity of voltage applied thereto with the result that a change occurs in the color of light emitted from the source L of white light and hence a change occurs in the hue of the face and bottle portions depending on the difference between the retardations of light transmitted through the positive domain and light transmitted through the half-wave plates. When no voltage or stress is applied to the crystal plate 3 of MOG, no change occurs in the polarization of the crystal plate which is therefore maintained in the existing state.

While the embodiments described above have referred to the case in which a set of polarizing elements, that is, a polarizer and an analyzer is so disposed that the vibrational planes of polarization of these elements cross at right angles with each other, the present invention includes also an arrangement in which the polarizing elements have their vibrational planes of polarization crossed at any other suitable angle.

EXAMPLE 14

If electrodes are provided on the opposite Z-planes of a Z-plate of MOG crystal which is 10 mm in the diameter and 2 mm in thickness and a pressure of about 100 g is applied in the direction of b axis of the crystal with the said electrode short-circuited, the spontaneous strain of the crystal is reversed.

If the electrodes are not short-circuited, the reversal of the strain will not occur even under a pressure of 10 kg.

EXAMPLE 15

In the above Example 14, it is sometimes found that mutually orthogonal domains are produced as indicated by A, B and A', B' in FIG. 25. If the pressure is further increased, the crystal is possible to break by a force acting between the orthogonal domains.

To prevent this, the pressure may be applied in a direction slightly (1°– 30°) inclined against the b axis in the Z-plane, or the same purpose is attained by removing either one set of the A and A' domains or the B and B' domains.

What is claimed is:

1. An irregular ferroelectric element having a controllable single-domain comprising:
   1. a substrate of an irregular ferroelectric crystal, having an opposite pair of major surfaces parallel to the Z-plane, said substrate comprising
      a. a first single-domain with a part of the periphery thereof extending in the <110> direction and having a first stationary polarity,
      b. a second single-domain with a part of the periphery thereof extending in the <110> direction and having a second stationary polarity which is opposite to said first stationary polarity, and
      c. a controllable single-domain with a part of the periphery thereof joining with said first single-domain in the <110> direction at the periphery of said first single domain, while the opposite part of the periphery of said controllable single-domain joins with said second single-domain in the <110> direction at the periphery of said second single domain, and having a domain - wall which extends in the <110> direction and which is reversibly movable in the <1$\overline{1}$0> direction from one of the joining peripheries to the other, and
   2. polarization reversal means disposed on the opposite Z-plane surfaces of said substrate, and covering at least said controllable single-domain, for controlling the polarity of said controllable single domain.

2. An element according to claim 1, wherein said polarization reversal means comprises optically transparent electrodes respectively disposed on said pair of major surfaces and a voltage source which is capable of providing an electric field necessary for reversing the polarity of said controllable single domain by means of said electrodes.

3. An element according to claim 2, wherein said irregular ferroelectric is gadolinium molybdate.

4. An element according to claim 2, characterized in that said substrate of an irregular ferroelectric crystal is so cut as to have two opposite major surfaces parallel to the Z-plane and four side surfaces each parallel to the <110> plane.

5. An element according to claim 3, characterized in that said substrate of gadolinium molybdate is so cut as to have two opposite major surfaces parallel to the Z-plane and four side surfaces each parallel to the <110> plane.

6. An irregular ferroelectric crystal element according to claim 1, characterized in that said substrate of an irregular ferroelectric crystal is so cut as to have two opposite major surfaces parallel to the Z-plane and four side surfaces each parallel to the <110> plane.

7. A system of irregular ferroelectric elements each having a controllable single-domain, comprising:
1. a plurality of triangular sections each made of a substrate of gadolinium molybdate, each substrate section having an opposite pair of major surfaces which are parallel to the Z-plane, an edge of the respective triangular sections being parallel to the <110> direction, each section of said substrate comprising
   a. a first single-domain in an end portion in the <110> direction of said substrate with an end thereof extending in the <110> direction and having a first stationary polarity,
   b. a second single-domain in the apex portion opposite to the edges parallel to the <110> direction with an end thereof extending in the <110> direction and having a second stationary polarity which is opposite to said first stationary polarity, and
   c. a single-domain having a controllable polarity between said first and second single-domains, with one end thereof joining with said <110> end portion of said first single-domain and the other end joining with said <110> end portion of said second single-domain, and having a domain-wall which extends in the <110> direction and which is reversibly movable in the <1$\bar{1}$0> direction from one of said <110> end of said first single-domain to said <110> end of said second single-domain;
2. said plurality of triangular substrate sections being disposed with the Z-planes thereof coplanar withh each other, the apices thereof joining at one point, and the edges thereof being non-parallel to the <110> direction joining one another, and;
3. polarization reversal means disposed on the opposite Z plane surfaces of the plurality of said substrate sections, so as to cover at least the single domains having a controllable polarity.

8. an irregular ferroelectric element having a controllable single domain comprising:
   a. a body of an irregular ferroelectric crystal having a pair of opposite major surfaces parallel to the Z-plane, said body including
      i. a first single domain having stationarily a first polarity,
      ii. a second single domain having stationarily a second polarity opposite to the first polarity, and
      iii. a controllable single domain integrally formed between said first and second single domains, boundary faces between said controllable single domain and both said first and second single domains extending the <110> direction, respectively,
      said controllable single domain having a movable domain wall which extends in the <110> direction and is reversibly movable in the <1$\bar{1}$0> direction between the boundary faces,
      a section of said controllable single domain between said first single domain and said movable domain wall having the first polarity but a section of said controllable single domain between said second single domain and said movable domain wall having the second polarity; and
   b. control means for causing the movable domains wall to move from one of the boundary faces to the other.

9. An irregular ferroelectric element according to claim 8, wherein said control means comprises:
   a. electrodes connected to said body of the irregular ferroelectric crystal which are formed on the opposite major surfaces thereof, so as to be in contact with at least said controllable single domain, and
   b. means for applying a voltage to said electrodes, the polarity of said voltage determining the sign of direction of movement of said movable domain wall.

10. An irregular ferroelectric element according to claim 8, wherein said controllable single domain possesses a first section of the first polarity between said first single domain and said movable domain wall and a second section of the second polarity between said second single domain and said movable domain wall, said first section being increased from zero to the entire area of said controllable single domain and said second section being decreased from the entire area of said controllable single domain to zero as said movable domain wall moves from the boundary face between said controllable single domain and said first single domain to the boundary face between said controllable single domain and said second single domain, and vice versa.

11. An irregular ferroelectric element according to claim 8, wherein said crystal is a crystal selected from the group consisting of gadolinium molybdate, its crystallographic isomorphs and boracite.

12. An irregular ferroelectric element according to claim 8, wherein said crystal is a crystal belonging to the point group imm 2.

13. An irregular ferroelectric element according to claim 8, wherein said crystal is a crystal defined by the formula $(R_xR'_{1-x})_2O_3 \cdot 3Mo_{1-e} We O_3$, (where R and R' represent at least one of the rare earth elements, x lies in the range of 0 to 1.0, and e lies in the range of 0 to 0.2).

14. A method for modulating a light beam comprising the steps of:
polarizing said light beam in a first predetermined direction;
intercepting said polarized light beam with a quarter wave plate; and
disposing in the path of the light beam to be modulated an irregular ferroelectric crystal having a controllable single domain which comprises a body of an irregular ferroelectric crystal having a pair of opposite major surfaces parallel to the Z-plane, said body including
   i. a first single domain having stationarily a first polarity,
   ii. a second single domain having stationarily a second polarity opposite to the first polarity; and iii. a controllable single domain integrally formed between said first and second single domains, boundary faces between said controllable single domain and both said first and second single domains extending in the <110> direction, respectively, said controllable single domain having a movable domain wall which extends in the <110> direction and is reversibly movable in the <1T0> direction between the boundary faces, a section of said controllable single domain between said first single domain and said movable domain wall having the first polarity but a section of said controllable single domain between said second single domain and said movable domain wall having the second polarity;

applying a force of a predetermined controllable polarity across said controllable single domain to thereby cause movement of said movable domain wall, so as to vary the passage of light through said crystal; and polarizing the light passing through said crystal in a direction perpendicular to said first predetermined direction.

15. A method according to claim 14, wherein said step of applying a force comprising applying an electric field to said crystal.

16. A method according to claim 14, wherein said step of applying a force comprises applying a mechanical stress to said crystal.

17. An optical shutter system comprising a polarizer, a detector, and a quarter-wave plate, and including a system of irregular ferroelectric elements each having a controllable single-domain, disposed between said polarizer and said detector in series with respect to incident light, said system of irregular ferroelectric elements comprising:

1. a plurality of triangular sections each made of a substrate of gadolinium molybdate, each substrate section having an opposite pair of major surfaces which are parallel to the Z-plane, an edge of the respective triangular sections being parallel to the <110> direction, each section of said substrate comprising
    a. a first single-domain in an end portion in the <110> direction of said substrate with an end thereof extending in the <110> direction and having a first stationary polarity,
    b. a second single-domain in the apex portion opposite to the edges parallel to the <110> direction with an end thereof extending in the <110> direction and having a second stationary polarity which is opposite to said first stationary polarity, and
    c. a single-domain having a controllable polarity between said first and second single-domains, with one end thereof joining with said <110> end portion of said first single-domain and the other end joining with said <110> end portion of said second single-domain, and having a domain-wall which extends in the <110> direction and which is reversibly movable in the <1T0> direction from one of said <110> end of said first single-domain to said <110> end of said second single-domain;

2. said plurality of triangular substrate sections being disposed with the Z-planes thereof coplanar with each other, the apices thereof joining at one point, and the edges thereof being non-parallel to the <110> direction joining one another, and;

3. polarization reversal means disposed on the opposite Z-plane surfaces of the plurality of said substrate sections, so as to cover at least the single domains having a controllable polarity.

18. An optical shutter comprising a polarizer, a detector, and a first and second irregular ferroelectric element each having a thickness corresponding to a quarter-wavelength and disposed between said polarizer and said detectors in series with respect to incident light, each of said first and second irregular ferroelectric elements having a controllable single-domain and comprising:

1. a substrate of an irregular ferroelectric crystal of gadolinium molybdate having an opposite pair of major surfaces parallel to the Z-plane, said substrate comprising
    a. a first single-domain with a part of the periphery thereof extending in the <110> direction and having a first stationary polarity,
    b. a second single-domain with apart of the periphery thereof extending in the <110> direction and having a second stationary polarity which is opposite to said first stationary polarity, and
    c. a controllable single-domain with a part of the periphery thereof joining with said first single-domain in the <110> direction at the periphery of said first single domain, while the opposite part of the periphery of said controllable single-domain joins with said second single-domain in the <110> direction at the periphery of said second single domain, and having a domain-wall which extends in the <110> direction and which is reversibly movable in the <1T0> direction from one of the joining peripheries to the other, and 2. polarization reversal means disposed on the opposite Z-plane surfaces of said substrate, and covering at least said controllable single-domain, for controlling the polarity of said controllable single-domain, for controlling the polarity of said controllable single domain, said polarization reversal means comprising optically transparent electrodes respectively disposed on said pair of major surfaces and a voltage source which is capable of providing an electric field necessary for reversing the polarity of said controllable single domain by means of said electrodes, and wherein the first single-domain and the second single-domain of said first element is opposite to and in parallel with the first single-domain and the second single-domain of said second element, respectively, so that the polarities of the opposing single-domains are opposite to each other.

19. An optical shutter comprising a polarizer and a detector, and two irregular ferroelectric elements, each having a controllable single-domain and comprising 1. a substrate of an irregular ferroelectric crystal of gadolinium molybdate, having an opposite pair of major surfaces parallel to the Z-plane, said substrate comprising
    a. a first single-domain with a pair of the periphery thereof extending in the <110> direction and having a first stationary polarity,
    b. a second single-domain with a part of the periphery thereof extending in the <110> direction and having a second stationary polarity which is opposite to said first stationary polarity, and c. a controllable single-domain with a part of the periphery thereof joining with said first single-domain in the <110> direction at the periphery of said first single domain, while the opposite part of the periphery of said controllable single-domain joins with said second single-domain in the <110> direction at the periphery of said second single domain, and having a domain-wall which extends in the <110> direction and which is reversibly movable in the <1T0> direction from one of the joining peripheries to the other, and 2. polarization reversal means disposed on the opposite Z-plane surfaces of said substrate, and covering at least said controllable single-domain, for controlling the polarity of said controllable single domain, said polarization reversal means comprising optically transparent electrodes respectively disposed on said pair of major surfaces and a voltage source which is capable of providing an electric field necessary for reversing the polarity of said controllable single-domain by means of said electrodes, said elements having a thickness corresponding to quarter wavelength and being disposed between said polarizer and said detector in series with respect to incident light, with the first and the second single-domains of the respective elements positioned so as to be orthogonal to each other.

* * * * *